United States Patent [19]
Kellner

[11] Patent Number: 6,149,225
[45] Date of Patent: Nov. 21, 2000

[54] SELF ADJUSTING ROOF MOUNTING FOR A POP-UP CAMPER

[75] Inventor: Paul B. Kellner, Mishawaka, Ind.

[73] Assignee: Jayco, Inc., Middlebury, Ind.

[21] Appl. No.: 09/014,645

[22] Filed: Jan. 28, 1998

[51] Int. Cl.[7] ...................................................... B60P 3/355
[52] U.S. Cl. ............................................................ 296/173
[58] Field of Search ...................................... 296/173, 165

[56] References Cited

U.S. PATENT DOCUMENTS

| | | | |
|---|---|---|---|
| 3,286,414 | 11/1966 | Harrison et al. | 296/165 |
| 3,360,294 | 12/1967 | Cieslak | 296/165 |
| 4,856,841 | 8/1989 | Rafi-Zadeh | 296/165 |
| 5,704,677 | 1/1998 | Steury et al. | 296/173 |
| 5,769,485 | 6/1998 | Bontrager et al. | 296/173 |

*Primary Examiner*—Gary C. Hoge
*Attorney, Agent, or Firm*—Baker & Daniels

[57] ABSTRACT

The present invention involves pop-up camper with a roof located above a body. A lifting system is located within the body and is attached to the roof at a plurality of mounting positions. The lifting system includes a plurality of retractable posts adapted to extend in a direction along their axial centers so that when the posts are in an extended position they support the roof over the body. A mechanism adjusts the location of the mounting positions relative to the roof so that the mounting positions maintain alignment with the axial centers of the lifting system posts. The posts remained properly aligned with the mounting positions regardless of any differential thermal expansion or contraction of the roof relative the body. The adjusting mechanism centers the roof over the body by guide walls of a guide block which restrict the direction of relative movement between the posts and the mounting positions. A mounting bracket attaches the guide block to the roof and distributes forces from the posts on the roof. Each of the posts includes an end plug for sliding on the surface of the guide block. The guide block includes a channel, and each of the posts includes a rod, with the rod extending into the channel and retaining the roof relative to the posts.

24 Claims, 17 Drawing Sheets

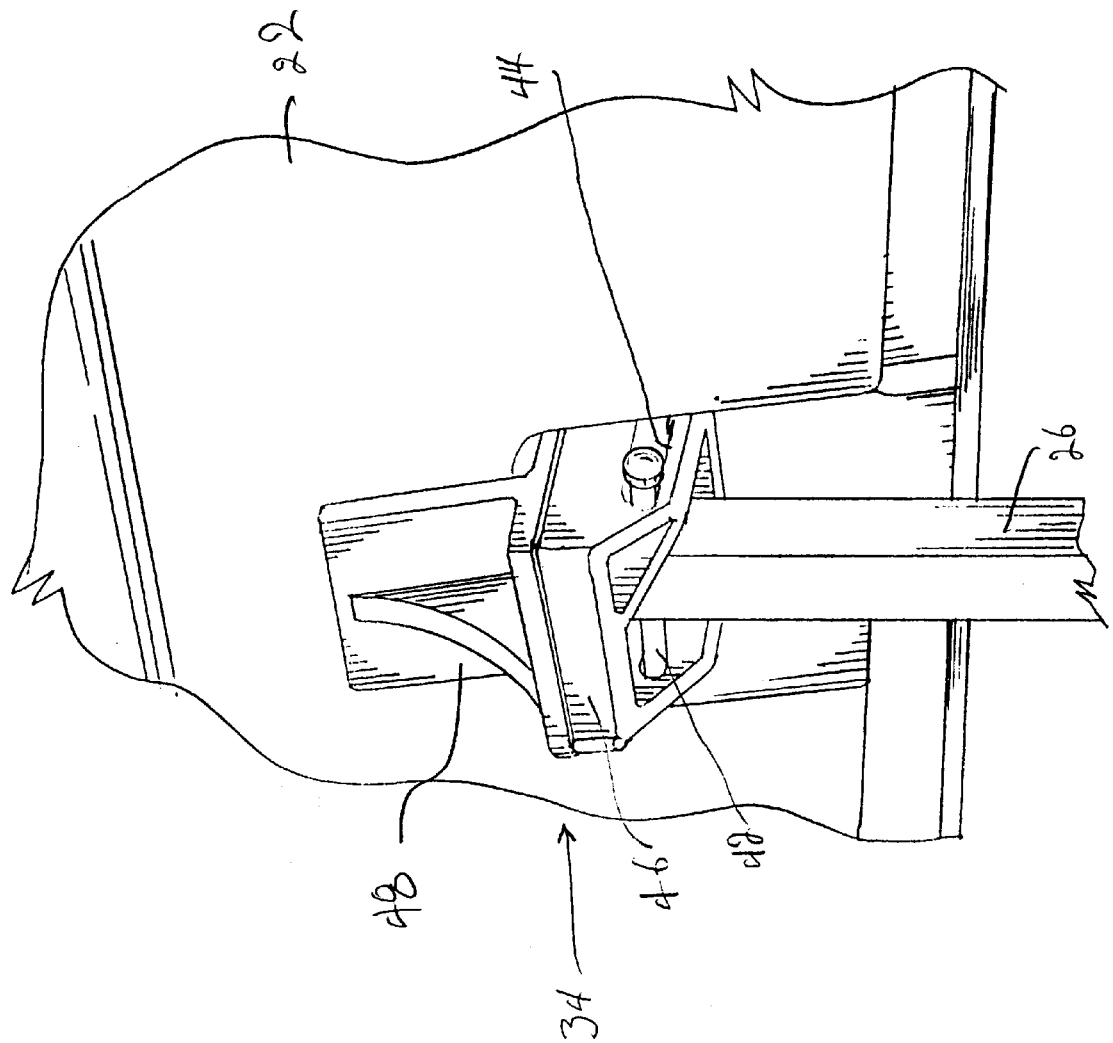
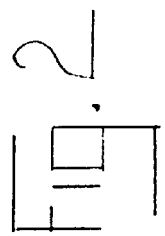

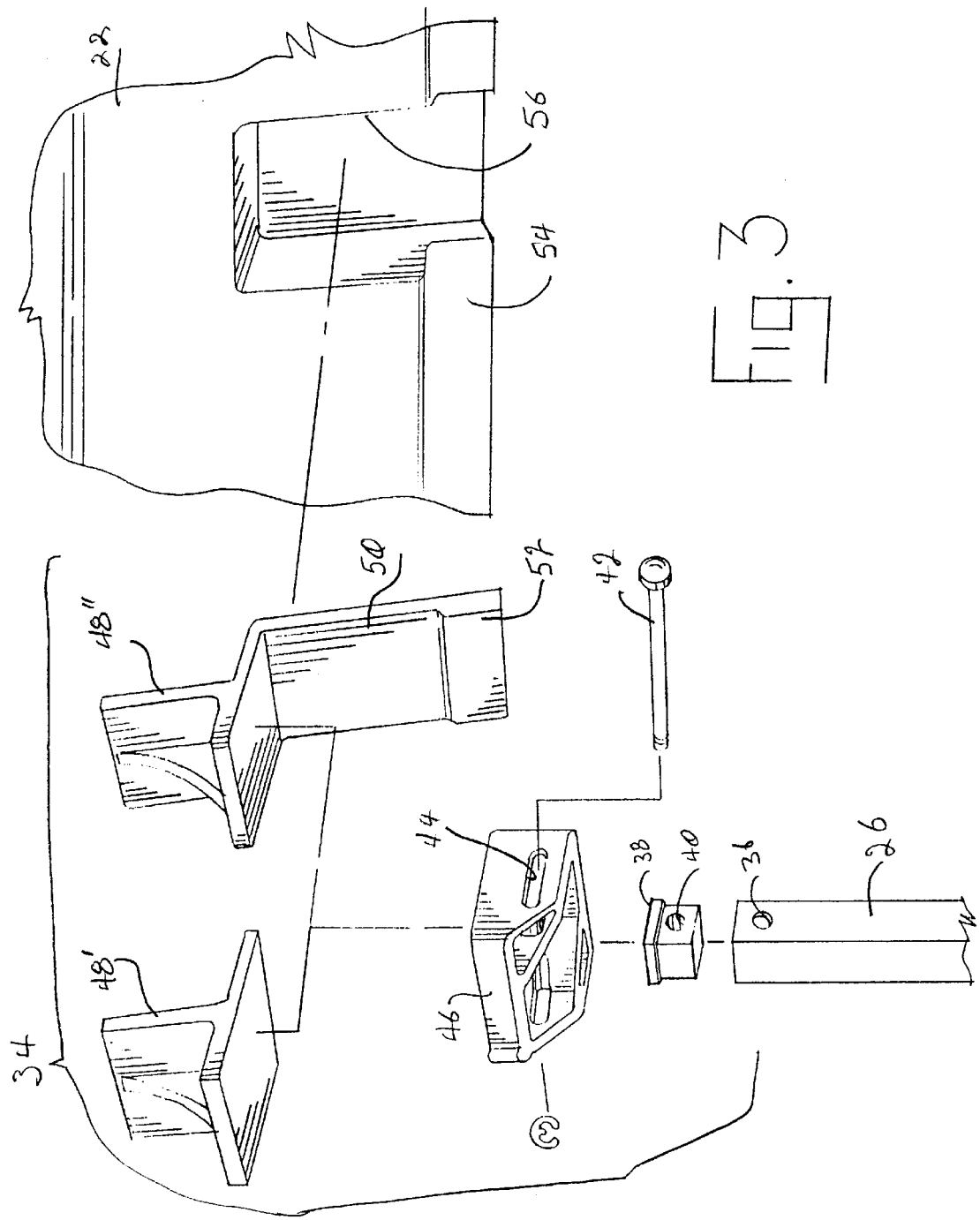

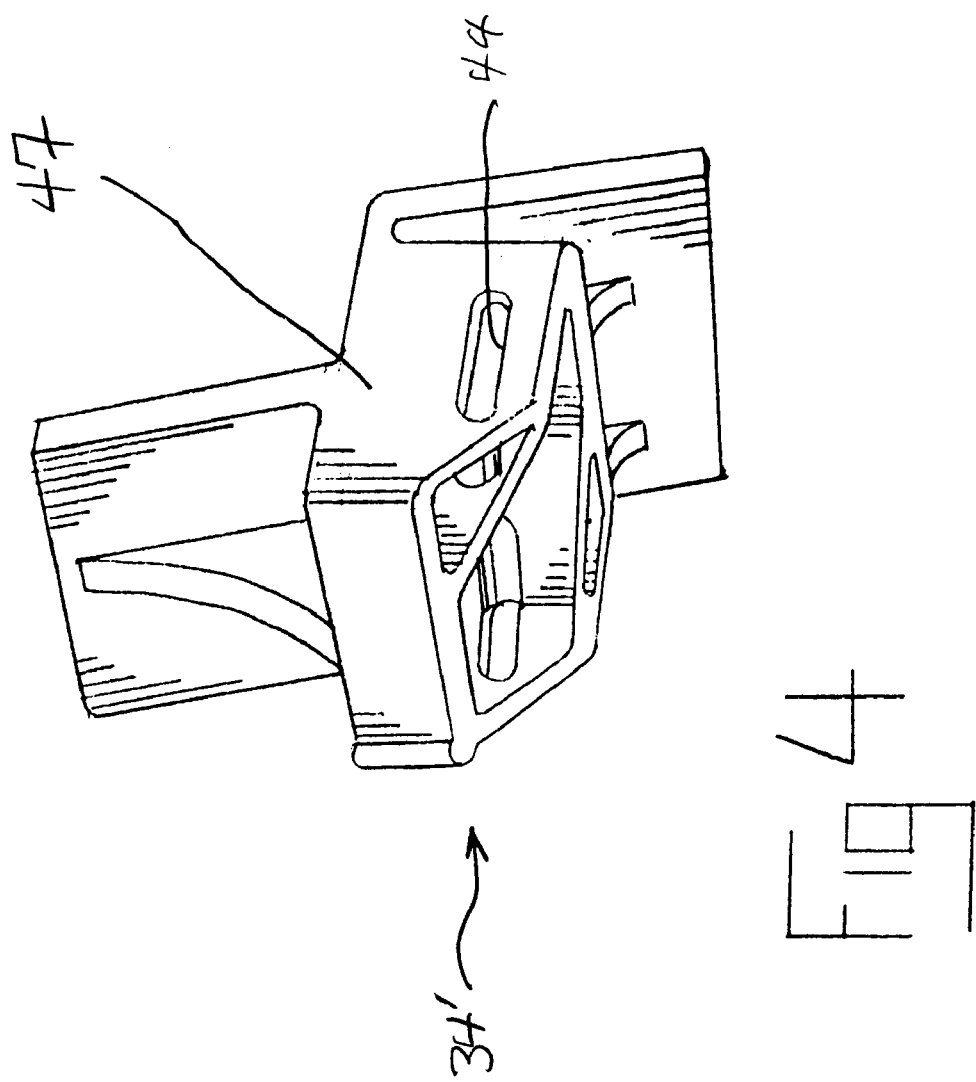

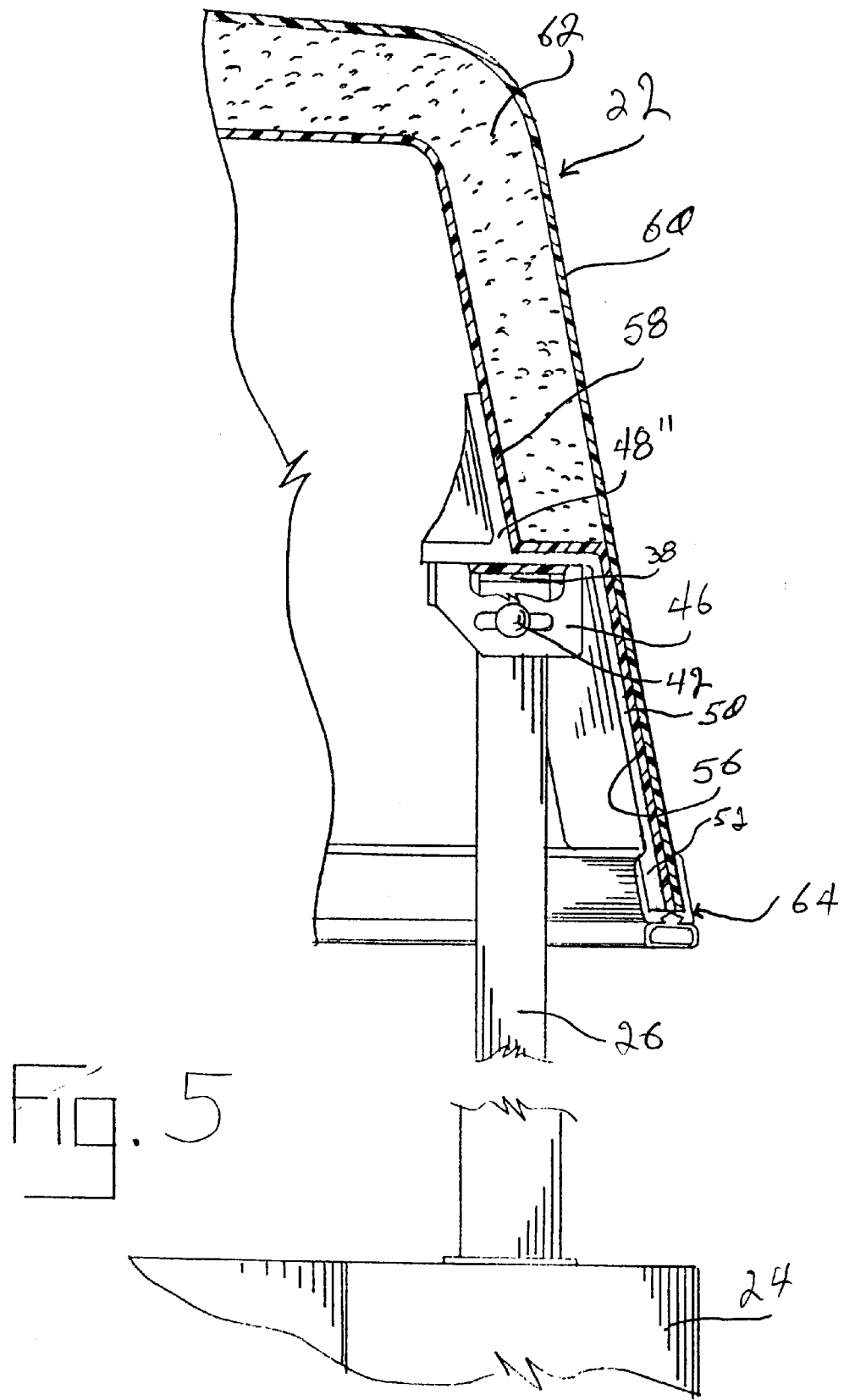

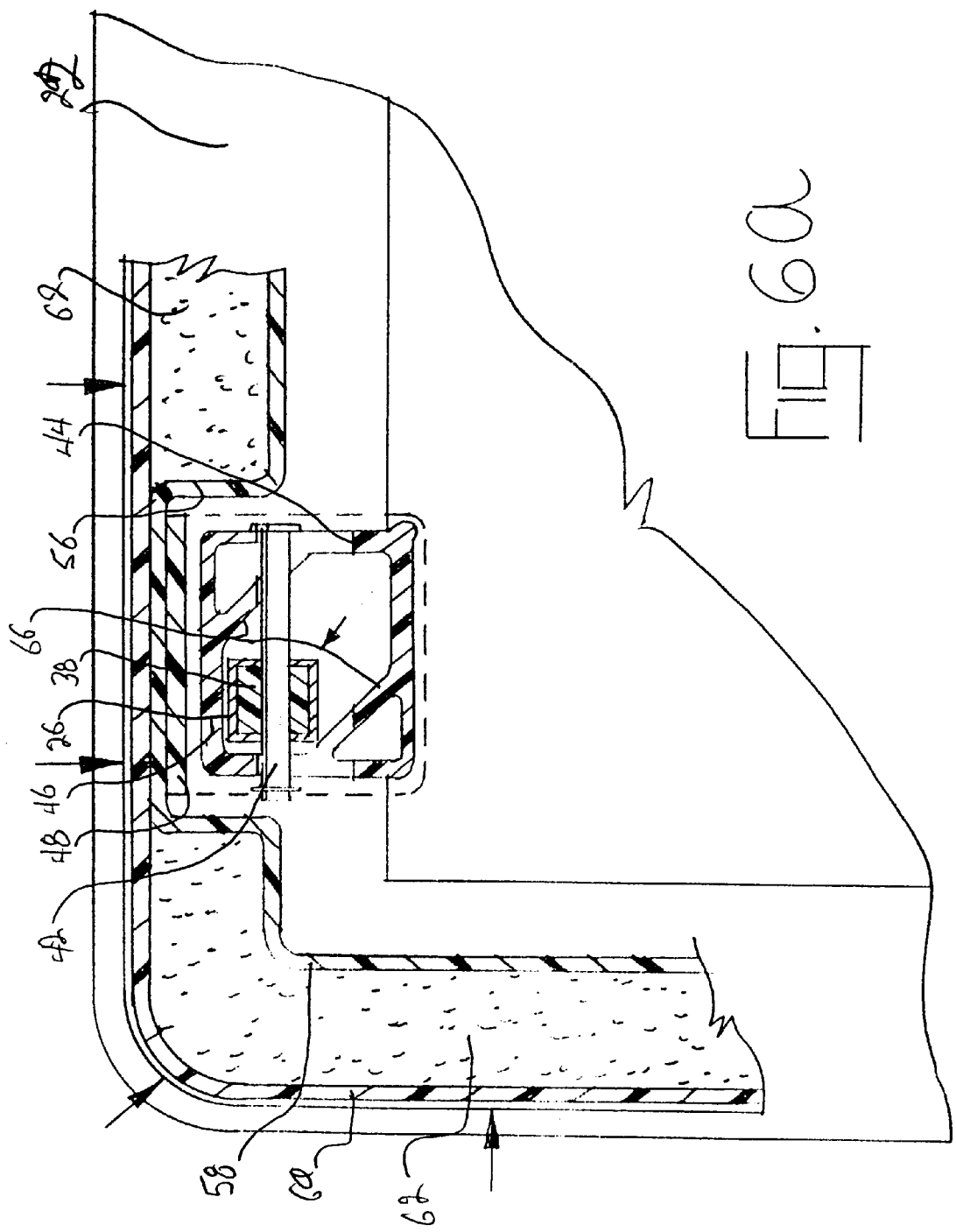

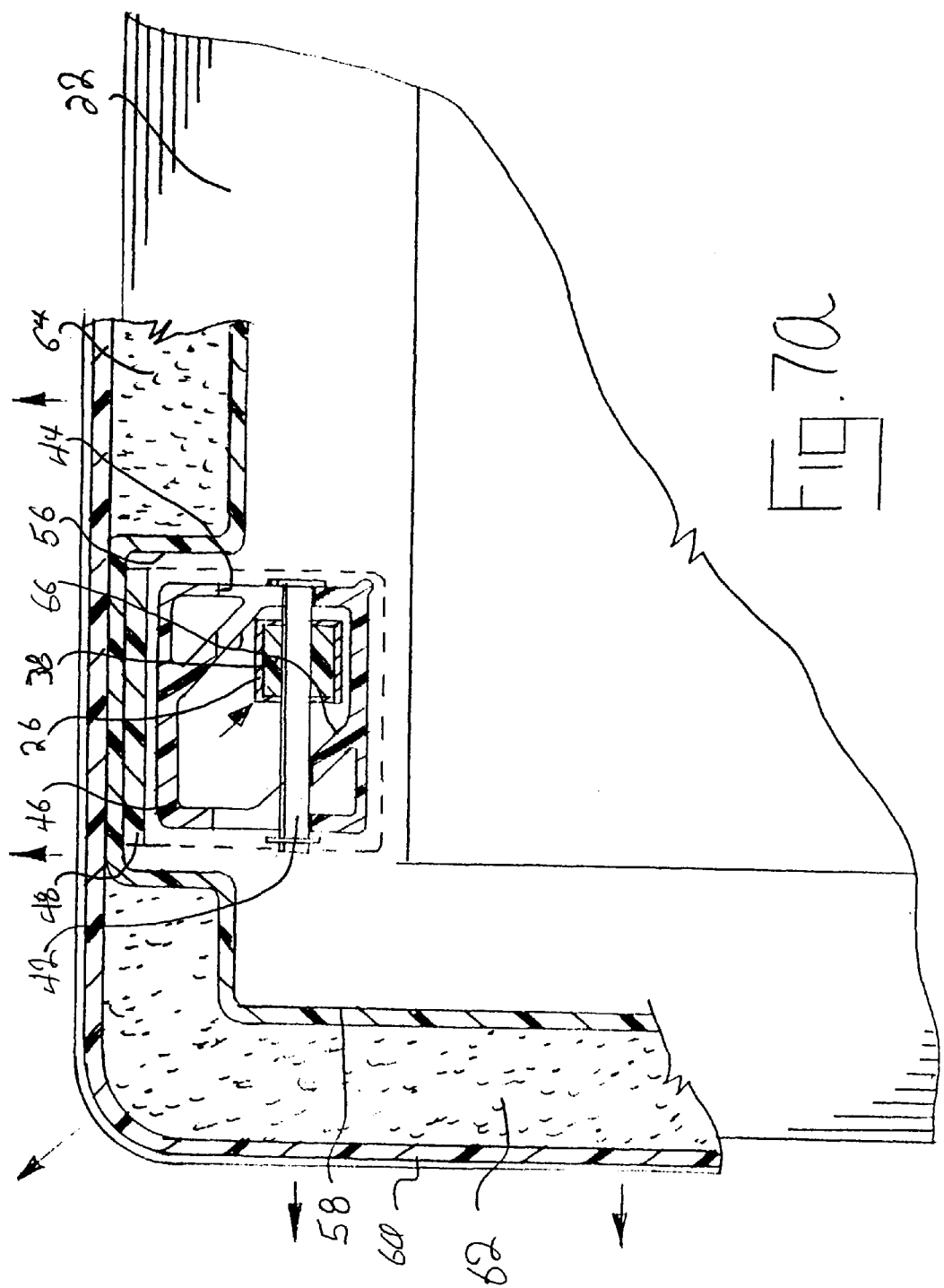

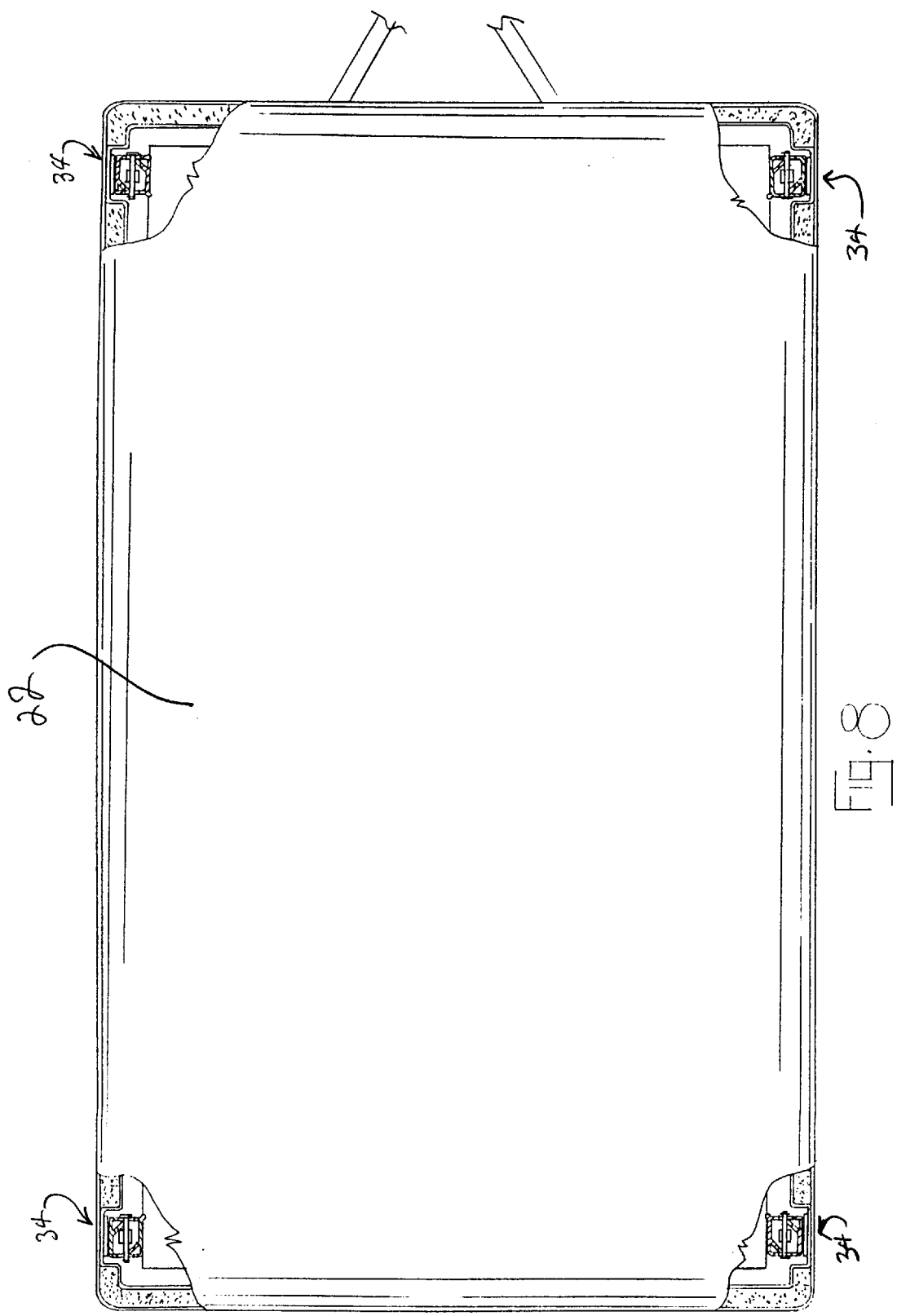

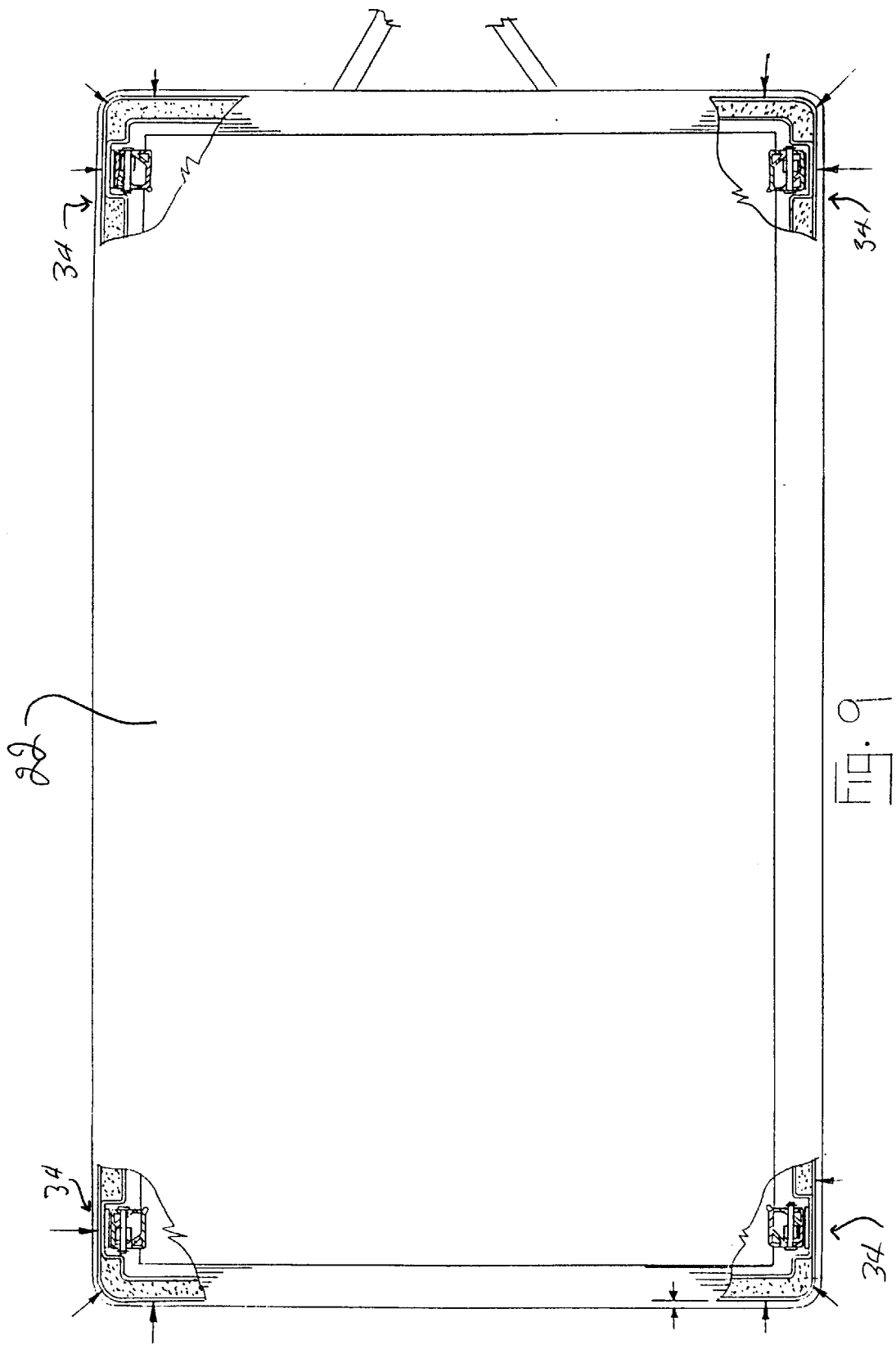

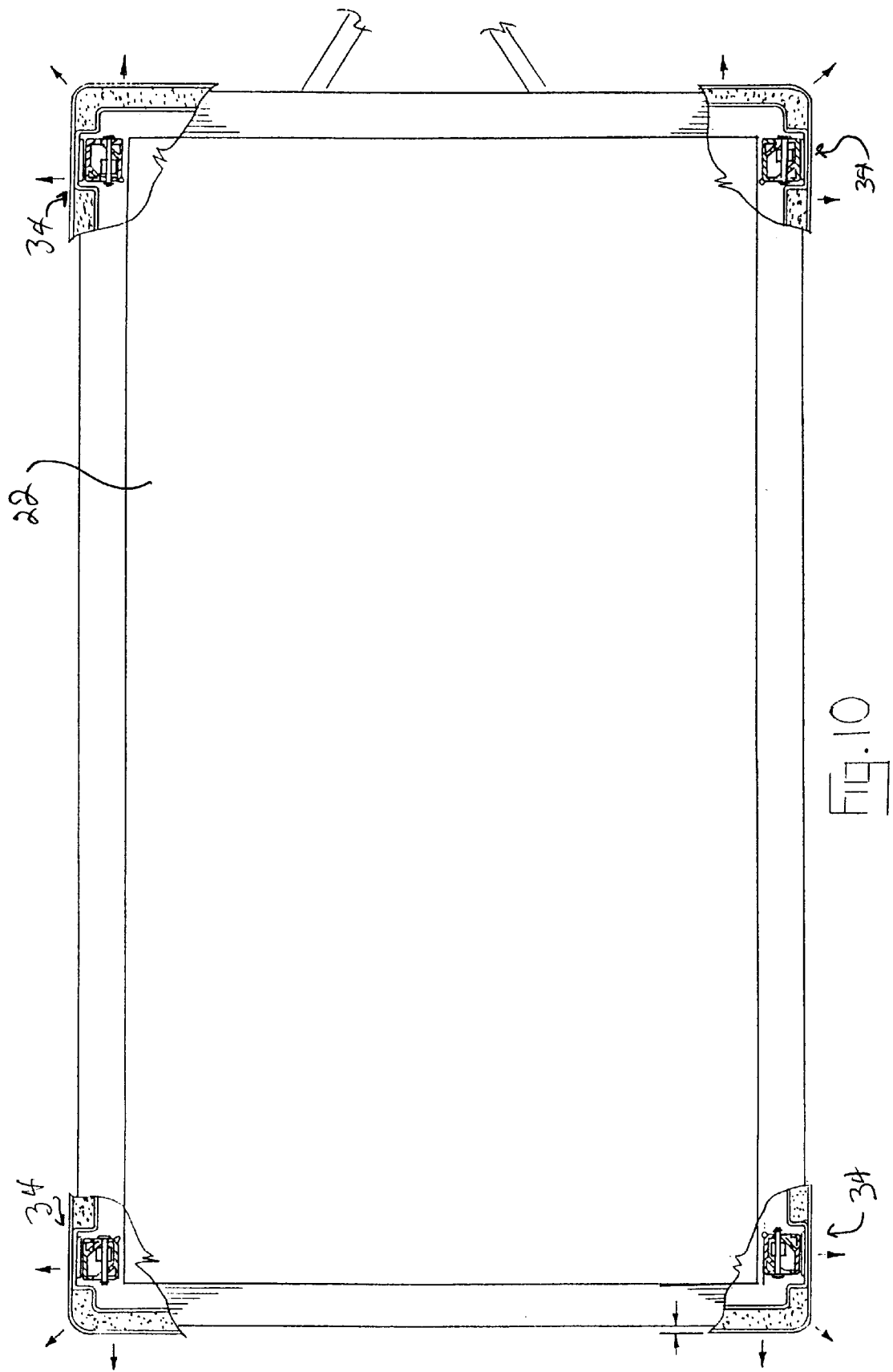

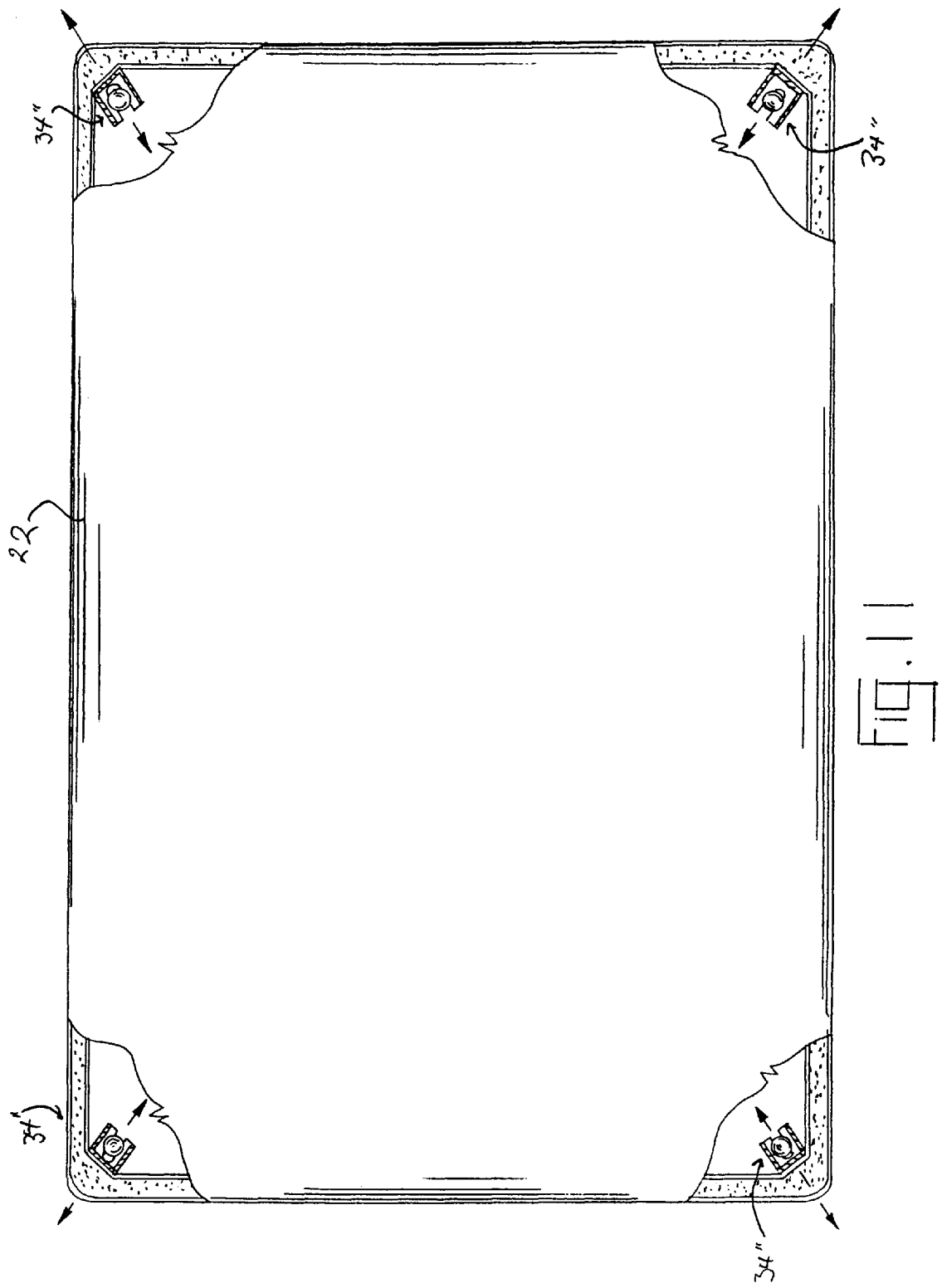

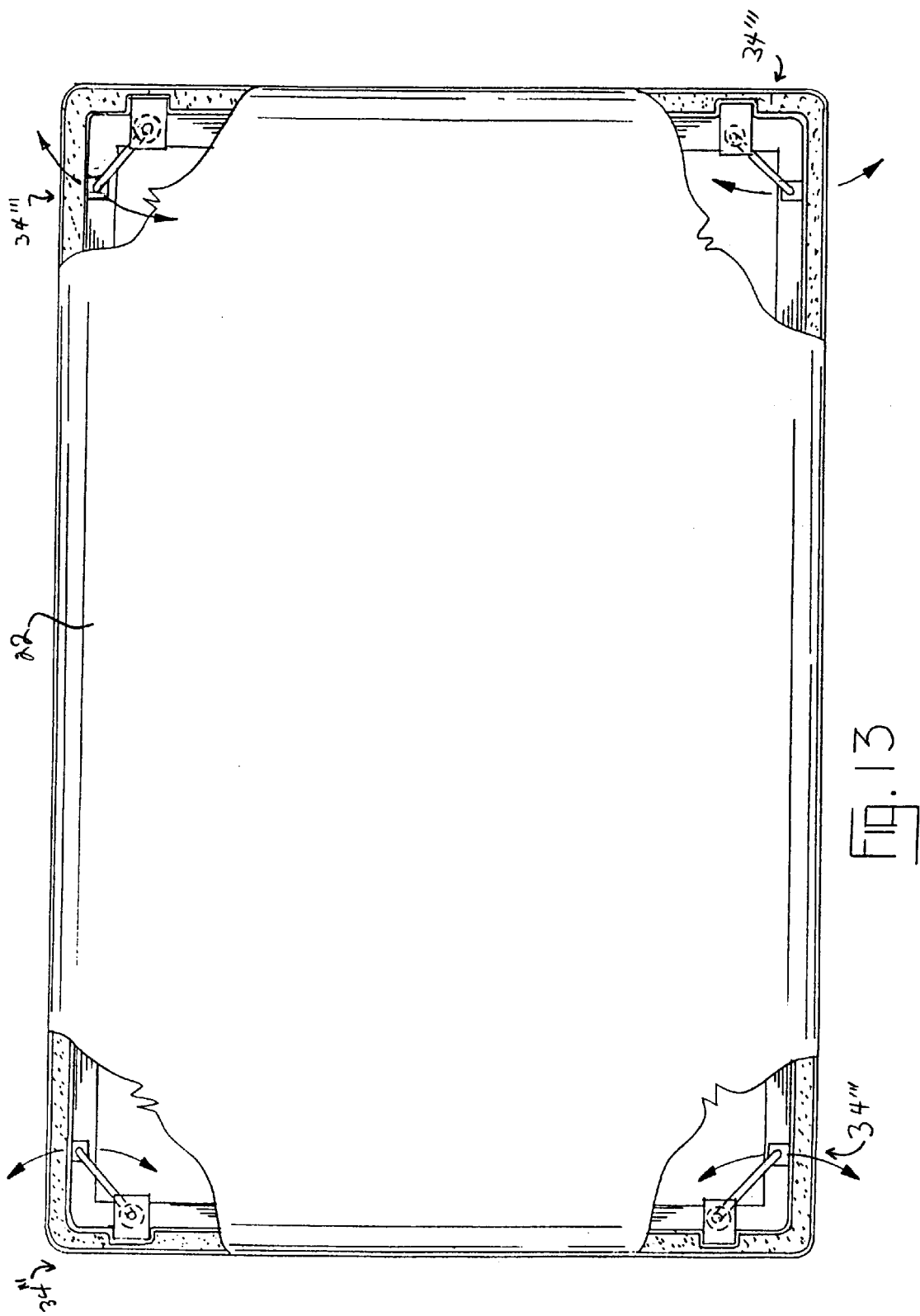

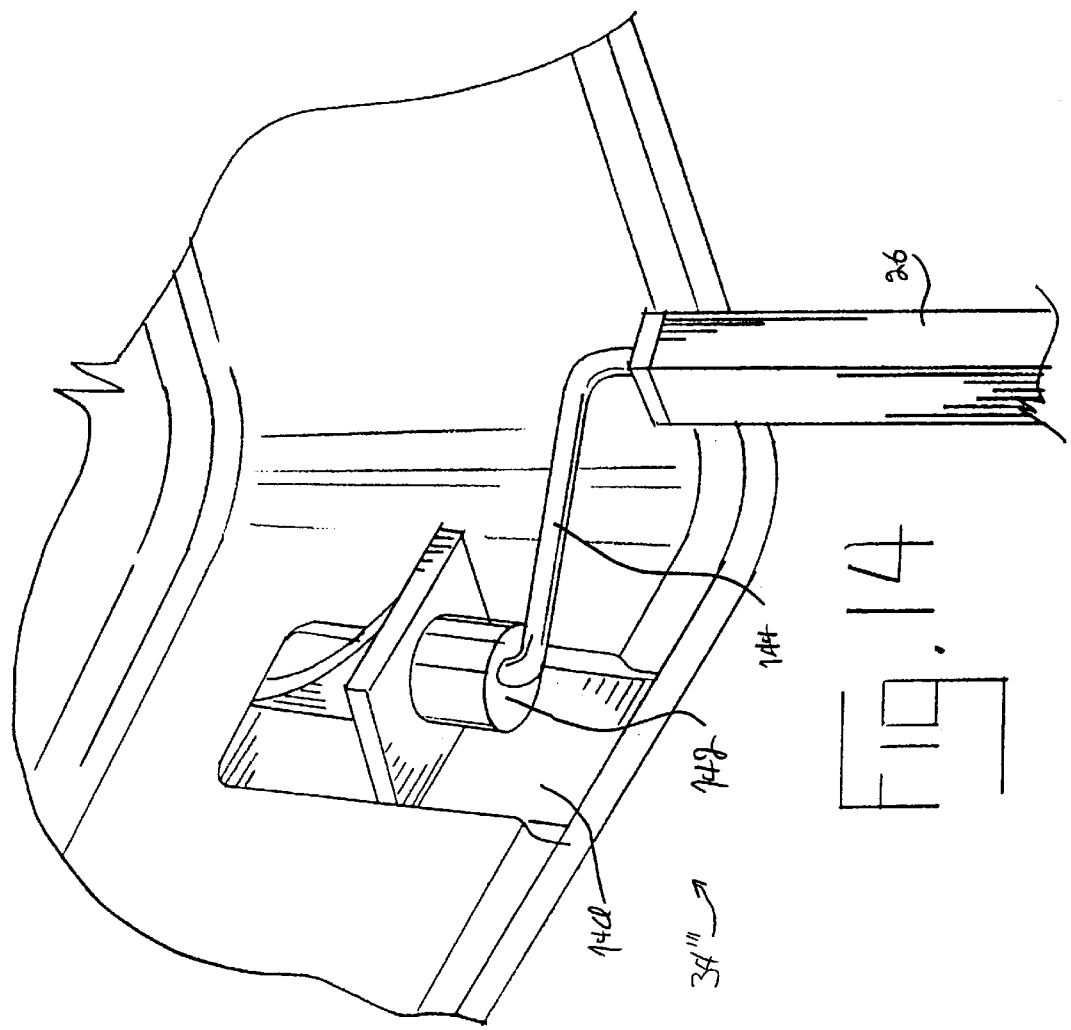

SELF ADJUSTING ROOF MOUNTING FOR A POP-UP CAMPER

BACKGROUND OF THE INVENTION

1. Field of the Invention

The invention relates to pop-up campers pulled on trailers or directly mounted in trucks. More specifically, the invention involves the mounting of a roof on the telescopic support posts of a pop-up camper.

2. Description of the Related Art

Pop-up campers are designed as small trailers or truck compartments which in their collapsed form can be transported by hitching the pop-up camper to a vehicle in the case of a trailer, or by securing the camper in the bed of the truck. Such campers are used for recreational camping in a variety of environments ranging from desert heat to sub-freezing conditions. Pop-up campers conventionally include an aluminum and/or wood body which has a floor and interior cabinets, tables, and benches surrounded by tent-like side walls when the roof is raised. When stationary, the pop-up camper may be deployed to provide living quarters for camping enthusiasts. In order to deploy the pop-up camper, the roof must be raised and tent panels extended so that the interior space is completely extended.

Pop-up campers conventionally utilize telescopic support posts as part of a lifting system to support and lift a roof over the camper body. One such telescopic support is disclosed in U.S. Pat. No. 4,299,421, assigned to the assignee of the present invention, the disclosure of which is incorporated by reference herein. To operate properly, the telescopic support posts should be aligned directly with mounting locations on the roof so that the force imparted by the lifting mechanism, e.g. a hand crank or electric motor, is sufficient to raise the posts. When the telescopic support posts are urged straight up, there is little frictional resistance to the extension. However, when the telescopic support posts are urged in a direction which is at an angle relative to their intended path of extension, frictional resistance to the movement of the segments of the post greatly increases the resistance to the lifting mechanism, thus increasing the difficulty in extending the telescopic support posts, and possibly resulting in failure to properly extend or retract the support posts. If the posts move when the roof is extended over the camper body, the tilting of the telescopic support posts actually resists the gravity retraction of the support posts.

While conventionally pop-up camper tops have been made of aluminum and/or wood because of their light weight and generally beneficial structural characteristics, many newer campers are made partially of a polymer material such as ABS plastic. Such polymer material has advantages over aluminum in several respects. While aluminum is permanently disfigured when dented, polymer material is capable of returning to a shape much closer if not identical to its original shape. Such polymer materials share many of the other beneficial structural characteristics of aluminum, but do not suffer from the denting problem. Polymer material provides similar structural rigidity as aluminum, but provide greater flexibility and resiliency to denting. The machinery for fabricating the polymer material roofs may also be less expensive and the total manufacturing time of a polymer material roof is less. Thus, many components of pop-up campers are now being made of suitable polymer materials.

However, polymer material experiences thermal expansion and contraction to a greater extent than aluminum. This material property is problematic if the pop-up camper body is made of different materials than the camper roof. For example, an aluminum camper body may expand significantly less than a polymer formed roof over a temperature swing, which can vary from −40° to 140° in ambient conditions, e.g., one quarter inch (¼") to one inch (1") depending on the direction of measurement. The mounting locations of the support posts relative to the body may then vary according to the temperature. In the foregoing example, while the posts may have been perfectly aligned at the original temperature, the temperature at the time of deployment may create a misalignment using conventional attaching methods. The one quarter (¼) to one and one quarter (1¼) inch differential may only be barely noticeable visually, but such a differential may create a critical misalignment and binding of the telescopic lifting system. Further binding of the system when closed may place excessive loads and stresses on the roof, lifter posts, or camper body leading to damage.

What is needed in the art is a mounting system for a pop-up camper roof lifting system which avoids these problems.

SUMMARY OF THE INVENTION

The inventional pop-up camper includes an adjustable mounting location for the roof lifting system. For campers which have a roof made of a different material than the camper body, the adjustable mountings allow the roof to thermally expand or contract without effecting the location of the roof relative to the lifting system.

In one form, the invention comprises a pop-up camper having a body, a roof, a lifting system, and the adjustable mountings. The lifting system is located within the body and is attached to the roof at a plurality of mounting positions. The lifting system also includes a plurality of retractable posts adapted to extend in a direction along the axial centers of the posts. In their extended position, the posts support the roof over the body. The adjustable mountings on the roof adjust the location of the mounting positions relative to the roof. This allows the mounting positions to be maintained in alignment with the axial centers of the posts of the lifting system. The posts thereby remain properly aligned with the mounting positions regardless of a differential thermal expansion or contraction of the roof relative the body.

In another form, the invention comprises a roof for a pop-up camper having such adjustable mountings to adjust the location of the mounting positions of relative to the roof. Existing camper lifting systems can be retrofitted to connect to the adjustable mountings so that a new roof made of materials with different thermal expansion properties than existing campers can be used on those campers.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 is a perspective view of the adjustable roof mounting of the present invention.

FIG. 3 is a an exploded view of FIG. 2.

FIG. 4 is a perspective view of an alternative embodiment of a component of the adjustable roof mounting.

FIG. 5 is a side sectional view of the adjustable roof mounting, while

FIG. 6 is a side sectional view of the adjustable roof mounting with the roof in an contracted state, while FIG. 6a is a top plan sectional view of FIG. 6.

FIG. 7 is a side sectional view of the adjustable roof mounting with the roof in an expanded state, while FIG. 7a is a top plan sectional view of FIG. 7.

FIG. 8 is a bottom plan view in partial cut-away of the roof.

FIG. 9 is a bottom plan view in partial cut-away of the roof in a contracted position.

FIG. 10 is a bottom plan view in partial cut-away of the roof in an expanded position.

FIG. 11 is a bottom plan view in partial cut-away of a second alternative embodiment of the roof mounting system.

FIG. 13 is a bottom plan view in partial cut-away of a third alternative embodiment of the roof mounting system.

FIG. 14 is a perspective view of the roof mounting system of FIG. 13.

Figure 1:
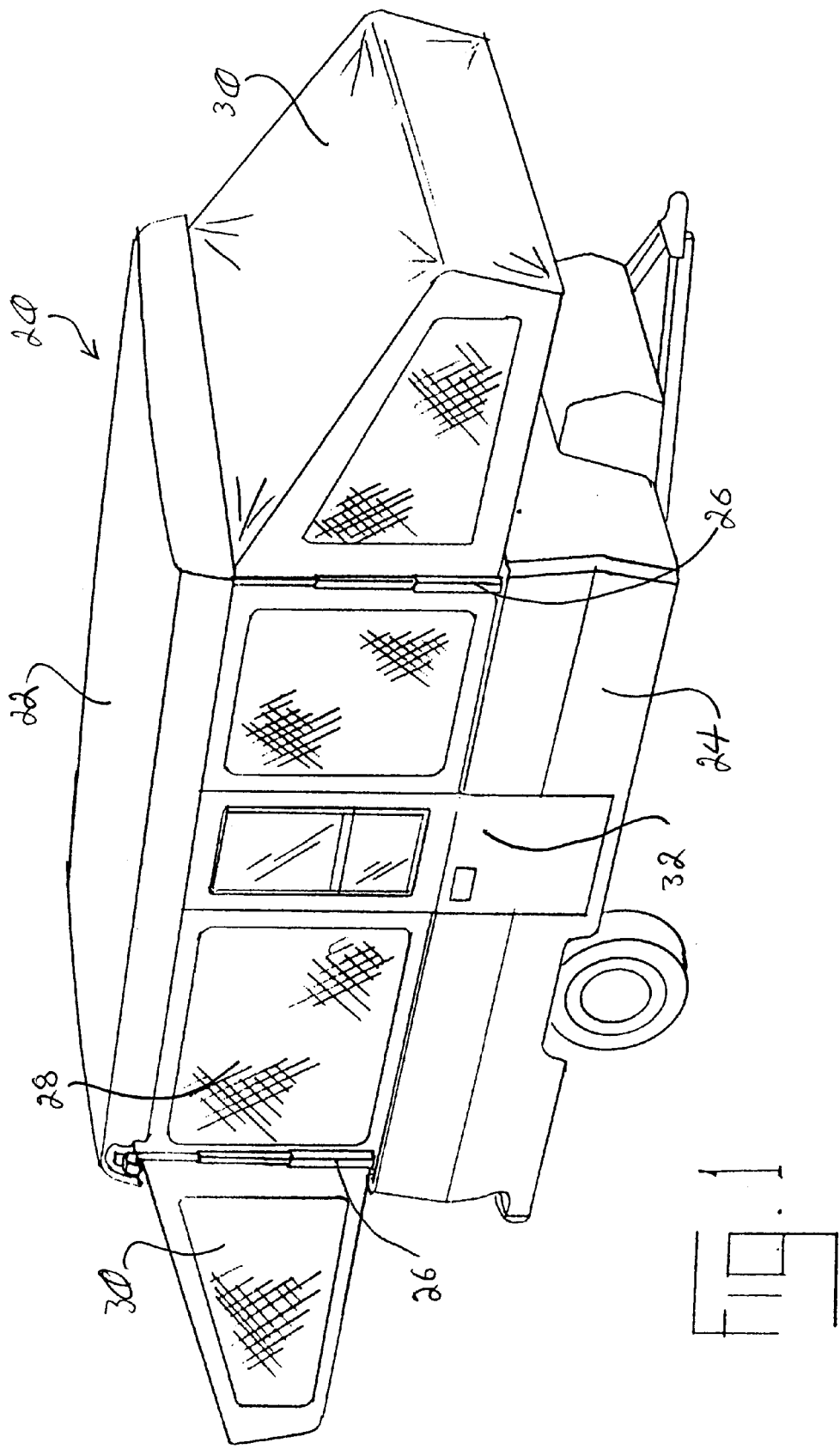
FIG. 1 is a perspective view of the pop-up camper of the present invention in the extended position.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

FIG. 1 shows camper 20 in a deployed condition. Roof 22, depicted as having a body in the form of a shell, is supported over camper body 24 by a plurality of retractable support posts 26, in this embodiment four posts 26 are disposed at the four corners of the generally rectangular configuration of camper body 24. Each retractable support post 26 actually includes a plurality of telescoping post segments, which may have a square, rectangular, round, etc. outer contour. Posts 26 fit within body 24 in the retracted arrangement, wherein roof 22 is disposed directly on top of camper body 24. Roof 22 is extended to the position of FIG. 1 by operation of a lifting system (not shown) which is adapted to urge support posts 26 upward and allow deployment of side panels 28, sleeper extensions 30, and door 32 between roof 22 and camper body 24.

In order to minimize the resistance of retractable support posts 26 to the operation of the camper lifting system, the locations where support posts 26 are mounted to roof 22 should be maintained in alignment with the axial center of posts 26. When roof 22 and camper body 24 are made of the same material, e.g. aluminum, then the resistance of retractable support posts 26 remains minimal as long as posts 26 are properly aligned relative to the mounting positions of roof 22 at manufacture. However, if roof 24 is made of a different material than camper body 24, a material having different thermal coefficients of expansion and contraction, then fixed mounting of posts 26 could result in an expanded or contracted roof 24 positioning a fixed mounting out of alignment with the axial centers of posts 26.

In accordance with the present invention, posts 26 are connected to roof 22 by adjustable mounting arrangement 34, see FIGS. 2 and 3. The upper end of post 26 includes hole 36 and an axial chamber (not shown in FIGS. 2 and 3) which receives end plug 38 which has hole 40 located in a corresponding position to hole 36. Holes 36 and 40 receive rod 42 which is slidably supported within channel 44 of guide block 46. The upper surface of end plug 38 may also slide on the lower surface of block 46. Block 46 is attached to mounting bracket 48 which is affixed to the bottom surface of roof 22. With this structure, the force or load imparted by post 26 is spread or distributed via the upper surface of end plug 38 onto block 46, which further spreads that force onto bracket 48 resulting in greatly reducing the probability of cracking or deformation of roof 22. In addition, the sliding engagement of rod 42 within channel 44 allows for the expansion and contraction of roof 22, and the corresponding displacement of bracket 48 and block 46, without effecting the alignment of post 26 as explained below in greater detail.

Mounting bracket 48 is shown in two alternative embodiments in FIG. 3. The embodiment of mounting bracket 48' has a lower end which simply connects with the upper portion of guide bracket 46. The embodiment of mounting bracket 48" has lower extension 50 which reaches the bottom edge of roof 22. Lower extension 50 includes a thicken portion 52 having a thickness which approximately equals the extra thickness of lip portion 54 of roof 22 compared to the thickness of indentation portion 56 of roof 22. Indentation portion 56 is created as a result of the manufacturing process of an ABS article needing a recess, and consequently the bottom portion of roof 22 cannot have a uniform thickness for registering and sealing purposes. However, with the provision of thickened portion 52, the bottom portion of roof 22 may have a uniform apparent thickness.

Figure 5A:
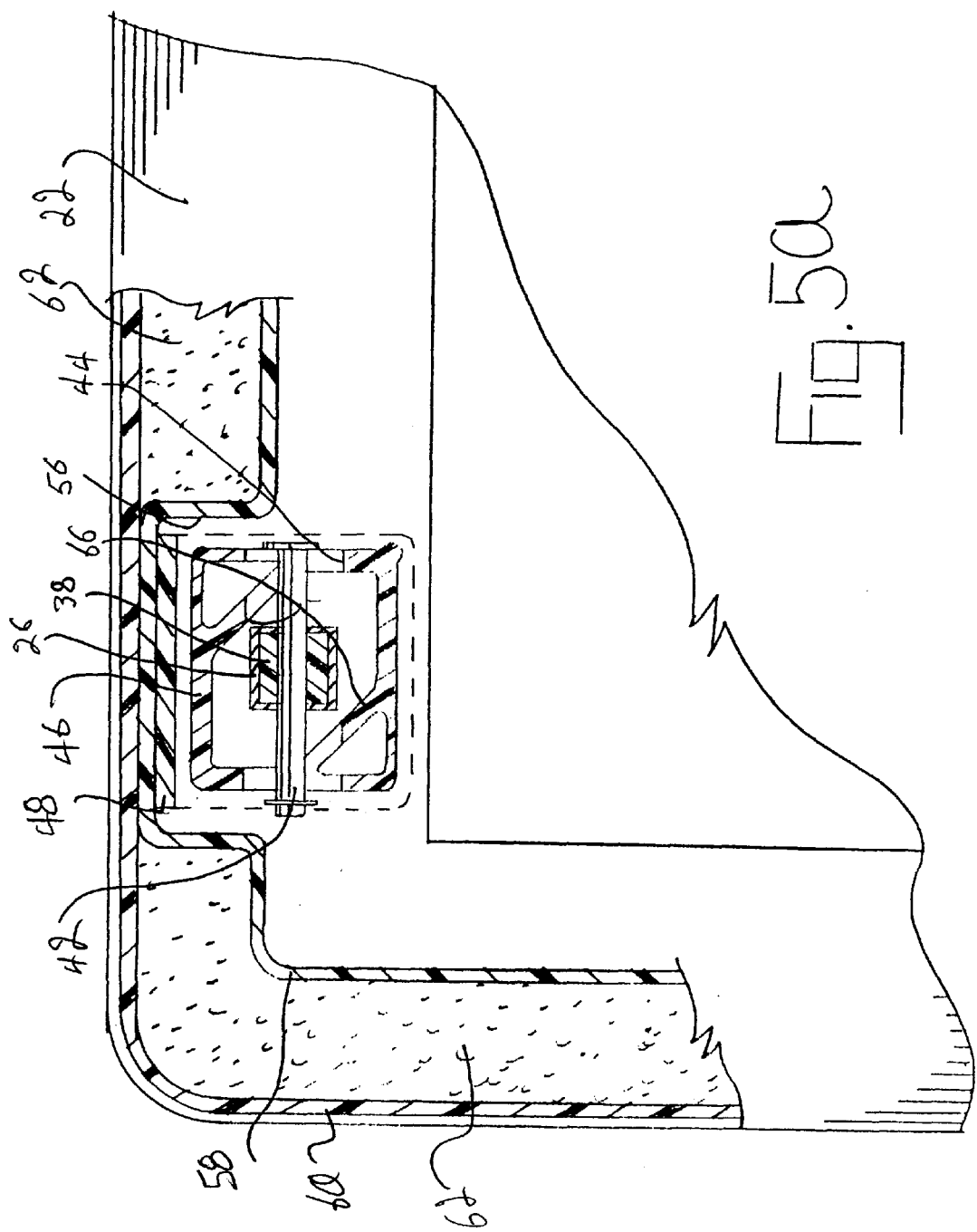
FIG. 5a is a top plan sectional view of FIG. 5.

FIGS. 5, 5a, and 8 show roof 22 in a normative position, that is when its temperature is such that its size generally corresponds to the size of camper body 24. In this normative position, posts 26 are generally aligned with their axes located around the center of guide block 46, see FIG. 8. End plug 38 rests against slide surface 58 of bracket 48", which in turn is attached to interior shell 58 of roof 22, see FIGS. 5 and 5a. Roof 22 also includes outer shell 60 and foam material 62 disposed between shells 58 and 60. Inner shell 58 and outer shell 60 also abut in the region of indentation portion 56, thus requiring thickened portion 52 to provide a uniform apparent thickness to facilitate the engagement of bottom seal 64, in this embodiment a bulb seal. In the undeployed position, bottom seal 64 forms a fluid repellant barrier between roof 22 and camper body 24 to protect the interior component of camper 20.

Figure 6:
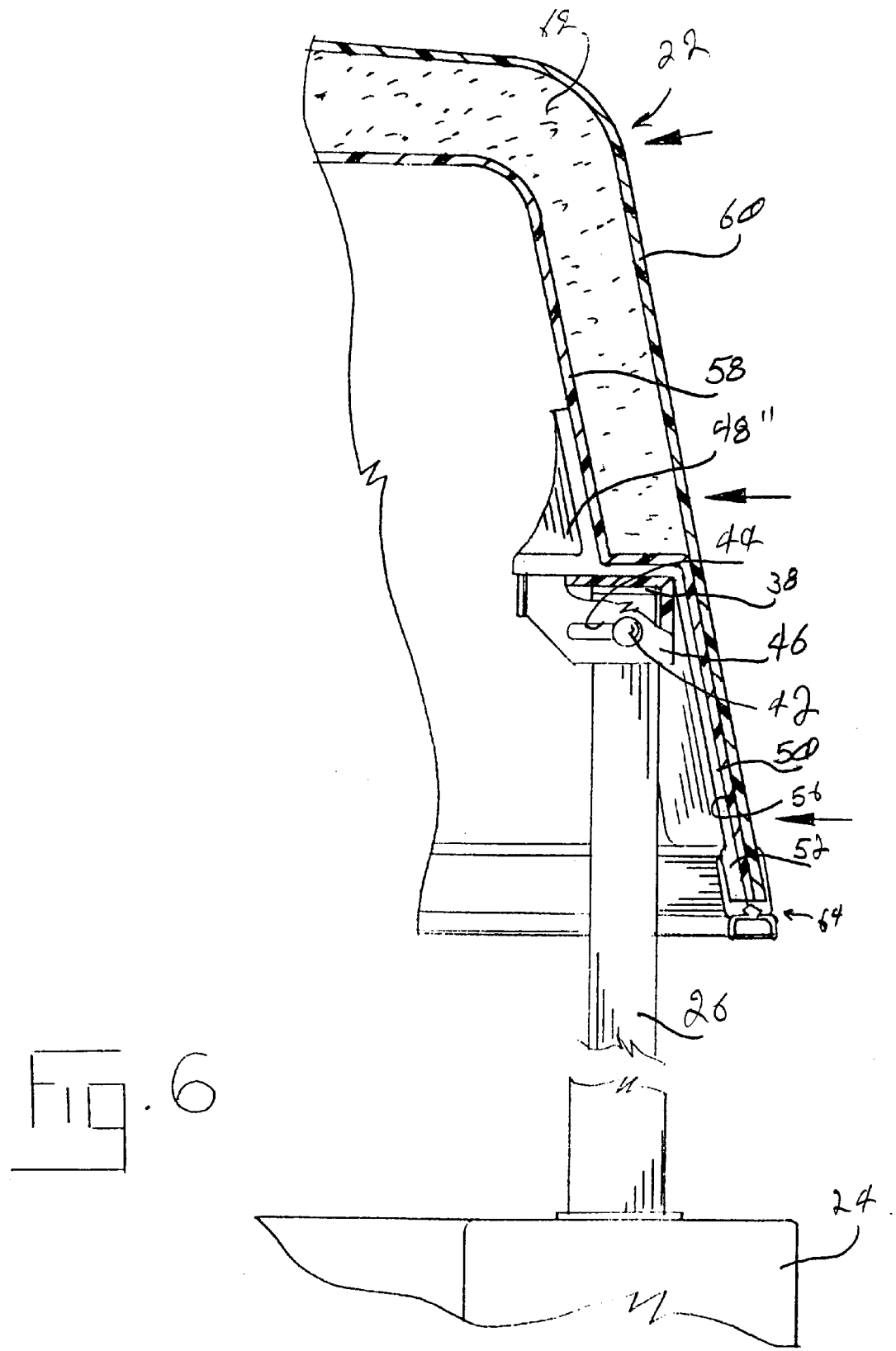

The case of the thermal contraction of roof 22 is depicted in FIGS. 6, 6a, and 9. FIG. 9 in particular shows how roof 22 may contract in relation to camper body 24, thus resulting in guide blocks 46 moving relative to posts 26. This inward contraction and movement of roof 22 does not effect the position of posts 26, as the sliding engagement of end plug 38 and guide block 46 allows rod 42 to move within channel 44, while the internal configuration of block 46, which includes guide walls 66, directs the movement of guide block 46, and its attached roof 22, relative to posts 26. Rod 42 retains posts 26 with roof 22 while allowing for the contraction movement of roof 22. The shape and relative configuration of guide walls 66 of all four mountings 34 serve to keep roof 22 approximately centered over camper body 24.

Figure 7:
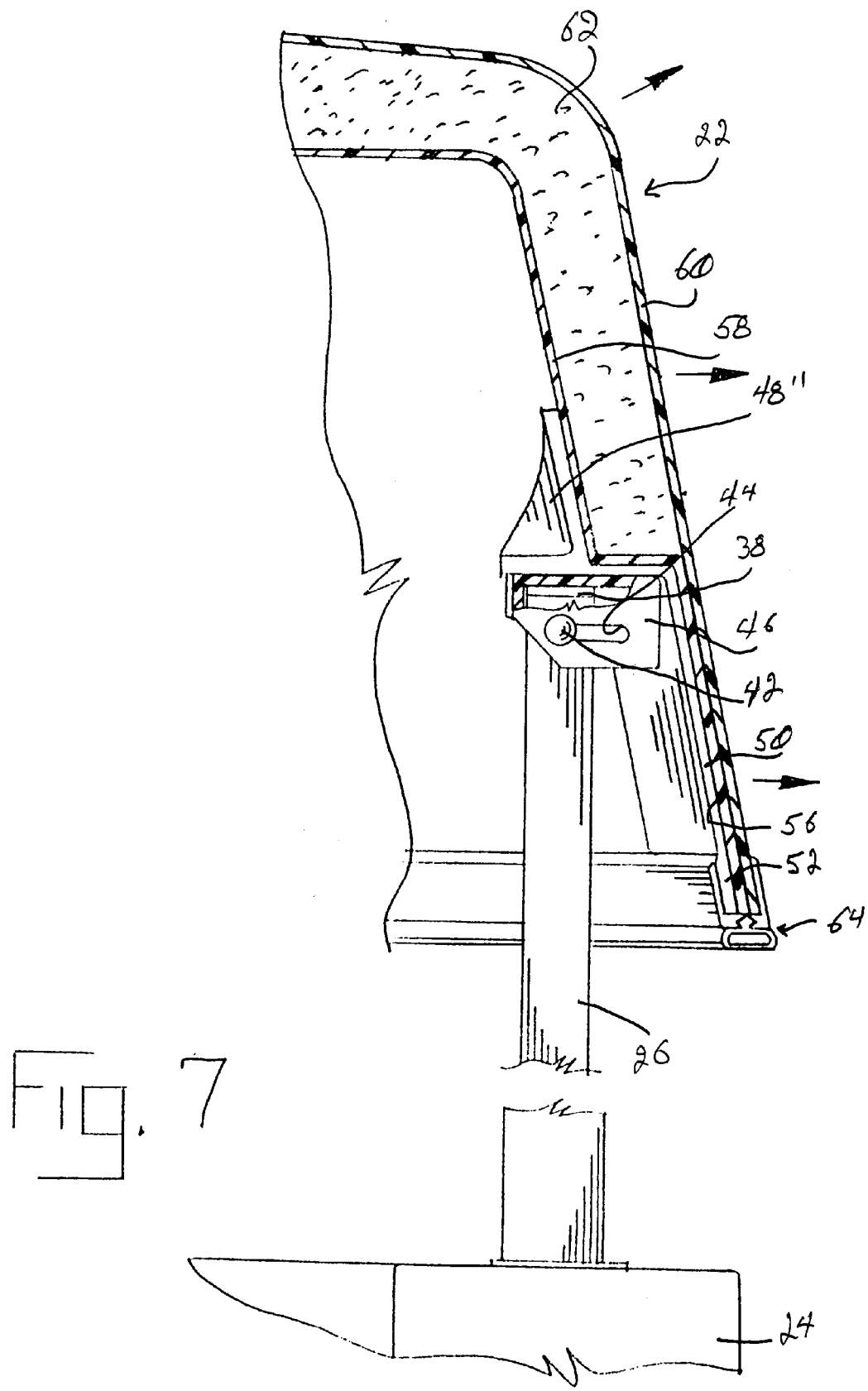

Similarly, the case of the thermal expansion of roof 22 is depicted in FIGS. 7, 7a, and 10. FIG. 10 in particular shows how roof 22 may expand in relation to camper body 24, thus resulting in guide blocks 46 moving relative to posts 26. This outward expansion and movement of roof 22 does not effect the position of posts 26, as the sliding engagement of end plug 38 and guide block 46 allows rod 42 to move within channel 44, while the internal configuration of block 46, which includes guide walls 66, directs the relative movement of guide block 46, and its attached roof 22, and posts 26. Rod 42 retains posts 26 with roof 22 while allowing for the expansion movement of roof 22.

FIG. 4 shows an alternative embodiment of mounting arrangement 34' which combines the structures of guide block 46 and mounting bracket 48 in the form of unitary guide bracket 47. Guide bracket 47 includes channel 44' for slidably receiving rod 42, with the underside of guide bracket 47 having a similar configuration to the underside of guide block 46 and the surface engaging roof 22 matching the corresponding surface of mounting bracket 48. While the embodiment of FIG. 4 shows guide bracket 47 having a configuration corresponding to mounting bracket 48' of FIG. 3, alternatively guide bracket 47 could have a configuration which corresponds to mounting bracket 48" of FIG. 3.

Figure 12:
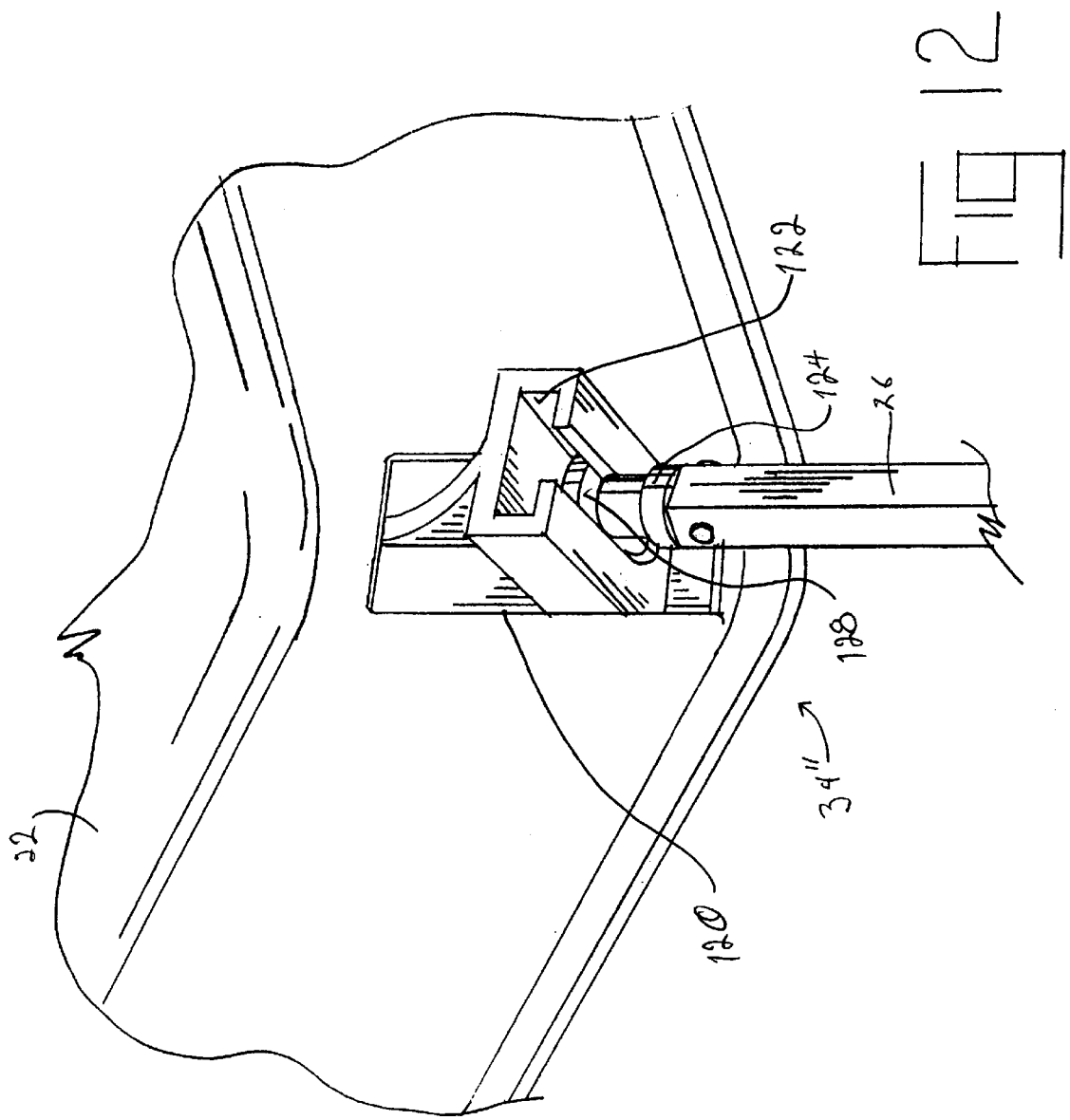
FIG. 12 is a perspective view of the roof mounting system of FIG. 11.

FIGS. 11–14 show further alternative embodiments of mounting arrangements according to the present invention. FIGS. 11–12 depict mounting arrangement 34", wherein guide block 120 includes channel 122 which accepts post cap 124. In the illustrated embodiment of FIG. 12, post cap 124 is attached to the upper portion of post 26 so that rider 128 engages channel 122 and constrains the movement of post 26 to be in the direction of channel 122. Guide block 120 is shown attached to the corner of roof 22, although guide block 120 could alternatively be disposed at an angle from a side of roof 22. As depicted in FIG. 11, guide blocks 120 of mounting arrangements 34" are disposed at an angle from the sides of roof 22. The angular position of channels 122 are dependent on the size and shape of roof 22, as well as the thermal expansion differential between roof 22 and the associated camper body.

FIGS. 13–14 depict another alternative mounting arrangement 34''', wherein mounting bracket 140 includes pivot guide 142. Rod 144 extends between pivot guide 142 and a pivot (not shown) located within post 26. As shown by the arrows of FIG. 13, rods 144 may swing when the thermal expansion or contraction of roof 22 relative to the camper body causes relative movement between posts 26 and mounting bracket 140. The length of rod 144 and its angular disposition are determined by the size and shape of roof 22, as well as the thermal expansion differential between roof 22 and the associated camper body.

In the undeployed state, camper 20 may include latches for securing roof 22 to camper body 24 during transportation. The design of mounting bracket 48" is particularly well suited to attach a latch of the extra material strength of thickened portion 52 which may provide a location for screws or the like. Alternatively, a latch may be unitarily formed in lower extension 50, so that any force exerted by the lifting system is exerted on the same component which includes the latch resisting the movement of the lifting system.

In the exemplary embodiment of the invention, camper body 24 is made of aluminum material, although steel or other similar materials may alternatively be used. Roof 22 is formed from ABS plastic, which has a thermal coefficient of expansion 4 to 5 times that of conventional material of camper body 24. Alternatively, roof 22 could be made of aluminum material and camper body 24 be made from ABS plastic. Mounting bracket 48 and guide block 46 are connected together and to inner shell 58 by adhesive material, such as an acrylic adhesive or an adhesive tape, although alternatively heat bonding and ultrasonic, plastic, or solvent welding may be used to connect those components. Metal fasteners may also be used to connect mounting bracket 46, guide block 46, and inner shell 58, but such metal fasteners could potentially create cracking problems for inner and outer shells 58 and 60. Foam material 62 may be Styrofoam or a urethane foam.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A pop-up camper comprising:
   a body;
   a roof located above said body;
   a lifting system located within said body and attached to said roof at a plurality of mounting positions, said lifting system including a plurality of retractable posts adapted to extend in a direction along axial centers of said posts, said posts capable of supporting said roof over said body when extended; and
   means for adjusting the location of said mounting positions relative to said roof so that said mounting positions maintain alignment with the axial centers of said plurality of posts of said lifting system whereby said posts remained properly aligned with said mounting positions regardless of a differential thermal expansion or contraction of said roof relative said body.

2. The pop-up camper of claim 1 wherein said adjusting means includes means for centering said roof over said body.

3. The pop-up camper of claim 2 wherein said centering means includes guide walls for restricting the direction of relative movement between said posts and mounting positions.

4. The pop-up camper of claim 1 wherein said adjusting means includes a guide block for accommodating relative movement of one of said posts and said roof.

5. The pop-up camper of claim 4 wherein said adjusting means further comprises a mounting bracket attaching said guide block to said roof and distributing forces from said posts on said roof.

6. The pop-up camper of claim 4 wherein each of said posts includes an end plug for sliding on the surface of said guide block.

7. The pop-up camper of claim 4 wherein said guide block and said mounting bracket are unitarily formed.

8. The pop-up camper of claim 4 wherein said guide block includes a channel, and each of said posts includes a rod, said rod extending into said channel and retaining said roof relative to said posts.

9. The pop-up camper of claim 8 wherein said guide block is aligned with said roof and has walls forming a generally hexagonal shape.

10. The pop-up camper of claim 4 wherein said guide block includes channel, and each of said posts includes an end cap, said end cap extending into said channel and retaining said roof relative to said posts.

11. The pop-up camper of claim 10 wherein said guide block is arranged at an angle relative to said roof and has walls forming a generally rectangular shape.

12. The pop-up camper of claim 1 wherein said adjusting means includes a plurality of rods, each said rod pivotally connected to one of said support posts.

13. A roof for a pop-up camper, the pop-up camper including a body with a roof lifting system having a plurality of posts, comprising:
 a roof body including a plurality of mounting positions for engaging the posts of the lifting system; and
 means for adjusting the location of said mounting positions relative to said roof body so that said mounting positions maintain alignment with the axial centers of the plurality of posts of the lifting system whereby the posts remain properly aligned with said mounting positions regardless of a differential thermal expansion or contraction of said roof body relative the camper body.

14. The roof for a pop-up camper of claim 13 wherein said adjusting means includes means for centering said roof over said body.

15. The roof for a pop-up camper of claim 14 wherein said centering means includes guide walls for restricting the direction of relative movement between said posts and mounting positions.

16. The roof for a pop-up camper of claim 13 wherein said adjusting means includes a guide block for accommodating relative movement of one of said posts and said roof.

17. The roof for a pop-up camper of claim 16 wherein said adjusting means further comprises a mounting bracket attaching said guide block to said roof and distributing forces from said posts on said roof.

18. The roof for a pop-up camper of claim 16 wherein each of said posts includes an end plug for sliding on the surface of said guide block.

19. The roof for a pop-up camper of claim 16 wherein said guide block and said mounting bracket are unitarily formed.

20. The roof for a pop-up camper of claim 16 wherein said guide block includes a channel, and each of said posts includes a rod, said rod extending into said channel and retaining said roof relative to said posts.

21. The roof for a pop-up camper of claim 20 wherein said guide block is aligned with said roof and has walls forming a generally hexagonal shape.

22. The roof for a pop-up camper of claim 16 wherein said guide block includes channel, and each of said posts includes an end cap, said end cap extending into said channel and retaining said roof relative to said posts.

23. The roof for a pop-up camper of claim 22 wherein said guide block is arranged at an angle relative to said roof and has walls forming a generally rectangular shape.

24. The roof for a pop-up camper of claim 13 wherein said adjusting means includes a plurality of rods, each said rod pivotally connected to one of said support posts.

* * * * *